US012634120B2

(12) United States Patent
Kitagawa

(10) Patent No.: US 12,634,120 B2
(45) Date of Patent: May 19, 2026

(54) CRYPTOGRAPHIC KEY INSTALLATION METHOD

(71) Applicant: RENESAS ELECTRONICS CORPORATION, Tokyo (JP)

(72) Inventor: Takashi Kitagawa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 187 days.

(21) Appl. No.: 18/324,509

(22) Filed: May 26, 2023

(65) Prior Publication Data

US 2024/0007270 A1      Jan. 4, 2024

(30) Foreign Application Priority Data

Jun. 30, 2022      (JP) ................................. 2022-106291

(51) Int. Cl.
*H04L 9/08*          (2006.01)
*G06F 21/72*         (2013.01)

(52) U.S. Cl.
CPC ............ *H04L 9/0819* (2013.01); *G06F 21/72* (2013.01); *H04L 9/0861* (2013.01)

(58) Field of Classification Search
CPC .................................................. H04L 9/0819
See application file for complete search history.

(56) References Cited

U.S. PATENT DOCUMENTS

| | | | | |
|---|---|---|---|---|
| 10,678,953 | B1 * | 6/2020 | Allo ...................... | H04L 9/0877 |
| 11,381,388 | B2 * | 7/2022 | Hong ................... | G06F 12/1408 |
| 12,231,537 | B2 * | 2/2025 | Ejiri ...................... | H04L 9/0822 |
| 2003/0131768 | A1 * | 7/2003 | Konning ................... | F23J 1/06 |
| | | | | 110/165 A |
| 2003/0163717 | A1 * | 8/2003 | Yoshimoto .............. | G06F 21/78 |
| | | | | 713/193 |
| 2005/0195975 | A1 * | 9/2005 | Kawakita .............. | H04L 9/3236 |
| | | | | 380/30 |
| 2006/0225126 | A1 * | 10/2006 | Brown ................ | H04L 63/0853 |
| | | | | 726/2 |
| 2022/0069983 | A1 * | 3/2022 | Yoshida ................... | H04L 9/12 |

FOREIGN PATENT DOCUMENTS

| | | | | | |
|---|---|---|---|---|---|
| EP | | 0784256 | A1 * | 12/1995 | ........... H04L 9/3271 |
| EP | | 97953075 | A * | 12/1997 | ............ H04L 9/302 |
| JP | 2022-040957 | A | | 3/2022 | |

* cited by examiner

*Primary Examiner* — Simon P Kanaan
(74) *Attorney, Agent, or Firm* — Rimon P.C.

(57)      ABSTRACT

A cryptographic key installation method of installing a customer key in a semiconductor device, wherein the semiconductor device includes a decryption functional unit that has a secret key installed therein in advance, and when the customer key encrypted by a public key corresponding to the secret key is installed, decrypts the encrypted customer key by the secret key installed in advance to generate a customer key, wherein an encryption device on a user side that uses the semiconductor device encrypts the customer key by the public key, and generates the encrypted customer key, and wherein a key installation device on the user side installs the encrypted customer key in the semiconductor device.

4 Claims, 4 Drawing Sheets

*FIG. 1*

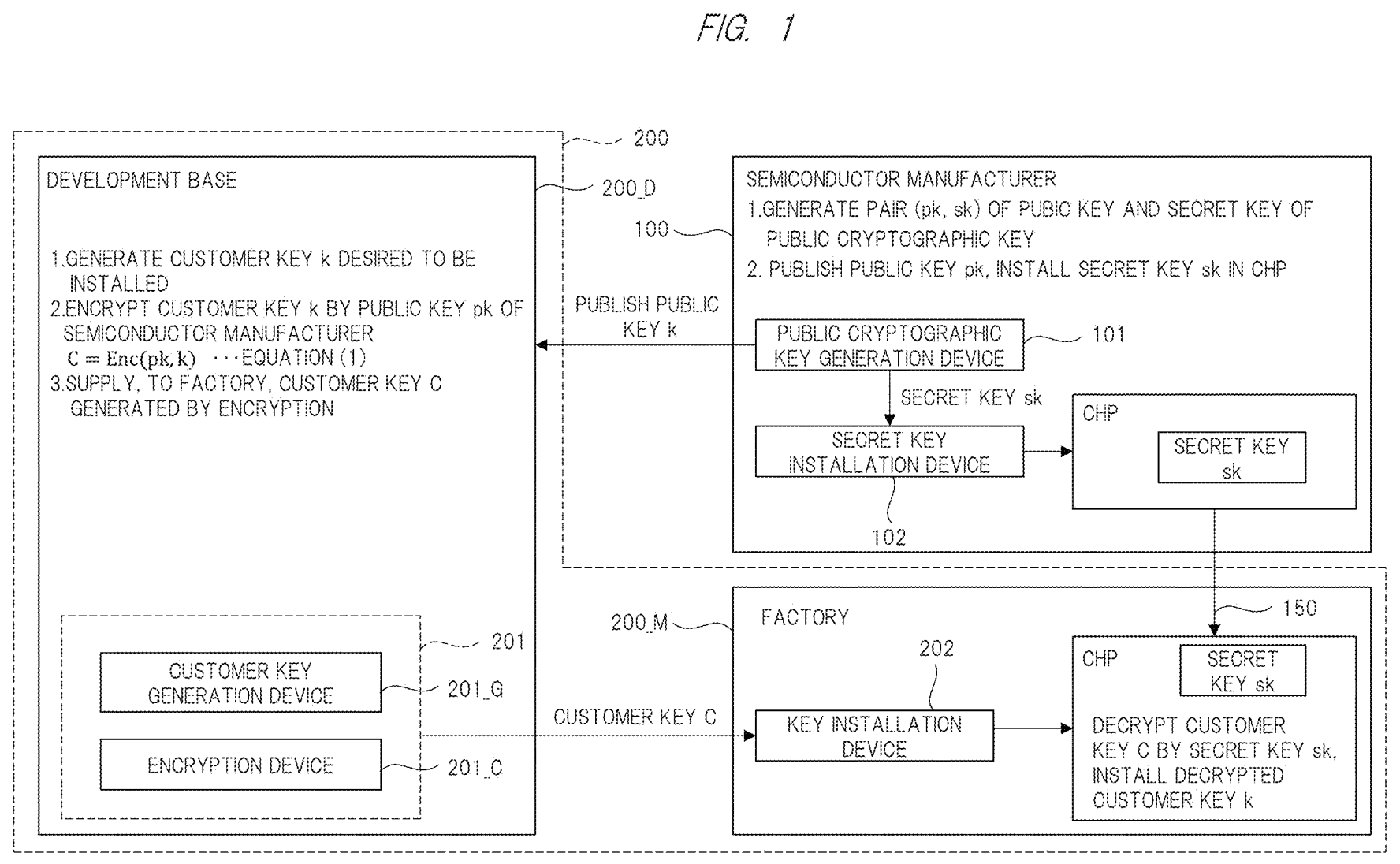

SEMICONDUCTOR MANUFACTURER

1.GENERATE PAIR (pk, sk) OF PUBLIC KEY AND SECRET KEY OF PUBLIC CRYPTOGRAPHIC KEY

2. PUBLISH PUBLIC KEY pk, INSTALL SECRET KEY sk IN CHP

PUBLIC CRYPTOGRAPHIC KEY GENERATION DEVICE — 101

SECRET KEY sk

SECRET KEY INSTALLATION DEVICE — 102

CHP

SECRET KEY sk

CHP — 150

SECRET KEY sk

DECRYPT CUSTOMER KEY C BY SECRET KEY sk, INSTALL DECRYPTED CUSTOMER KEY k

FACTORY

KEY INSTALLATION DEVICE — 202

200

200_D

100

PUBLISH PUBLIC KEY k

200_M

CUSTOMER KEY C

DEVELOPMENT BASE

1.GENERATE CUSTOMER KEY k DESIRED TO BE INSTALLED

2.ENCRYPT CUSTOMER KEY k BY PUBLIC KEY pk OF SEMICONDUCTOR MANUFACTURER
$C = Enc(pk, k)$ · · ·EQUATION (1)

3.SUPPLY, TO FACTORY, CUSTOMER KEY C GENERATED BY ENCRYPTION

201

201_G

201_C

CUSTOMER KEY GENERATION DEVICE

ENCRYPTION DEVICE

GENERATE
CUSTOMER KEY k

C=Enc(pk,k)···EQUATION (1)

ENCRYPT CUSTOMER KEY k BY
USING PUBLIC KEY pk OF
SEMICONDUCTOR MANUFACTURER

CUSTOMER
KEY C

INSTALL ENCRYPTED CUSTOMER KEY C IN CHP

IN CHP,
CUSTOMER KEY C IS DECRYPTED BY SECRET KEY sk,
CUSTOMER KEY k IS INSTALLED IN CHP

CUSTOMER
200

CHP

200_T

DEVELOPMENT BASE

200_D

200_M

FACTORY

CHP

CHP

CRYPTOGRAPHIC KEY INSTALLATION METHOD

CROSS-REFERENCE TO RELATED APPLICATIONS

The disclosure of Japanese Patent Application No. 2022-106291 filed on Jun. 30, 2022 including the specification, drawings and abstract is incorporated herein by reference in its entirety.

BACKGROUND

The present invention relates to a cryptographic key installation method of installing a cryptographic key in a semiconductor device, and for example, relates to a cryptographic key installation method of installing, in a semiconductor device, a cryptographic key of a user that uses the semiconductor device.

There is disclosed a technique listed below.
[Patent Document 1] Japanese Unexamined Patent Application Publication No. 2022-40957

For example, Patent Document 1 describes a system that manages an encryption key.

A user (hereinafter, also referred to as a customer or a user side) that uses a semiconductor device provides a product user with a customer product that incorporates the semiconductor device therein. In this case, the customer sometimes provides the product user with a variety of services. In order to provide the product user with the variety of services, the customer sometimes installs a key of the customer (hereinafter, also referred to as a customer key or a cryptographic key) in the semiconductor device to be incorporated. For example, the customer provides the product user with the services by an encrypted communication encrypted so as to be capable of being decrypted by the customer key. As a result, the services will be provided only to a customer product that incorporates therein a semiconductor device in which an appropriate customer key is installed.

SUMMARY

For example, the customer includes a development base where the customer product is developed, and manufacturing bases (hereinafter, also referred to as factories) where the product developed in the development base is actually manufactured. The factories are located not only domestically but also abroad frequently. It is concerned that there are factories where such customer keys cannot be managed sufficiently. In the case of installing the customer key in the semiconductor device in such a factory where the customer key is managed insufficiently, it is concerned that the customer key is leaked.

In order to prevent the leakage of the customer key from the factory, there is a cryptosystem in which a provider (hereinafter, also referred to as a semiconductor manufacturer or a provider side) that provides a customer with a semiconductor device generates a provider-side encryption key and a decryption key (hereinafter, also referred to as a provider-side decryption key) for decrypting the provider-side encryption key, and encrypts and decrypts the customer key by using the provider-side encryption key and the provider-side decryption key.

In this cryptosystem, the semiconductor manufacturer installs the provider-side decryption key in advance in the semiconductor device, and provides the customer therewith. This semiconductor device includes a decryption functional unit that, when the customer key encrypted by the provider-side encryption key is installed, decrypts the customer key by the provider-side decryption key installed in advance. In this case, in the semiconductor manufacturer, the customer key is encrypted by the provider-side encryption key.

In the factory, the customer installs the customer key, which is encrypted by the provider-side encryption key, in the semiconductor device. In the semiconductor device, the encrypted customer key is decrypted by the provider-side decryption key installed in advance, and is installed in the semiconductor device. The cryptosystem described above is adopted, so that the customer key handled in the factory is encrypted by the provider-side encryption key, and therefore, it becomes possible to prevent the customer key from being leaked.

However, after reviewing the cryptosystem described above, the inventor of the present invention noticed that the cryptosystem had such a problem as described below. That is, the customer needs to encrypt the customer key in the semiconductor manufacturer. It is considered that a customer that requires high security is concerned that the customer key is processed in the semiconductor manufacturer. Moreover, as such customer processing for encrypting the customer key by the provider-side encryption key, the customer accesses, for example, a server (semiconductor manufacturer server) provided in the semiconductor manufacturer, and by using the semiconductor manufacturer server, encrypts the customer key by the provider-side encryption key. Hence, there is also a problem that the processing of the customer becomes complicated. Further, since the semiconductor manufacturer that handles the customer key is required to manage the customer key with high security, management cost is considered to increase.

Patent Document 1 does not disclose the cryptosystem described above. As a matter of course, Patent Document 1 does not describe or suggest the above-described problem noticed by the inventor of the present invention.

An outline of a representative in embodiments disclosed in the present application will be briefly described below.

A cryptographic key installation method of installing a cryptographic key in a semiconductor device, wherein the semiconductor device includes a decryption functional unit that has a secret key installed therein in advance, and when the cryptographic key encrypted by a public key corresponding to the secret key is installed, is configured to decrypt the encrypted cryptographic key by the secret key to generate a cryptographic key, wherein a user side that uses the semiconductor device encrypts the cryptographic key by the public key, and generates the encrypted cryptographic key, and wherein the user side installs the encrypted cryptographic key in the semiconductor device.

Other objects and novel features will be apparent from the description in the specification and the accompanying drawings.

In accordance an embodiment, it becomes possible to provide a cryptographic key installation method capable of safely installing the cryptographic key in the semiconductor device while reducing the complicated processing.

BRIEF DESCRIPTION OF THE DRAWINGS

FIG. 1 is a diagram showing a customer key installation method according to an embodiment.

DETAILED DESCRIPTION

Figure 2:
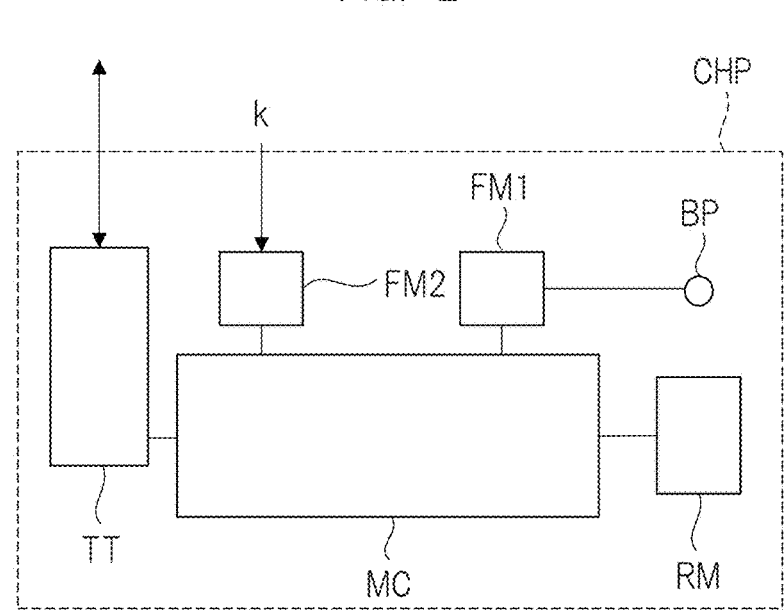
FIG. 2 is a block diagram showing a configuration of a semiconductor device according to the embodiment.

Hereinafter, a description will be given of respective embodiment of the present invention with reference to the drawings. Note that the disclosure is merely an example, and appropriate changes of the invention, which maintain the spirit thereof and are easily conceivable by those skilled in the art, are naturally included in the scope of the present invention.

Moreover, in some cases, in the present specification and the respective drawings, the same reference numerals are assigned to elements similar to those mentioned above regarding the already-discussed drawings, and a detailed description thereof is omitted as appropriate.

Outline of Embodiment

An embodiment will be described below. In order to facilitate the understanding, an outline of a cryptographic key installation method according to the embodiment will be described first. Herein, as an example, the case is described where a customer that purchases a semiconductor device provided by sale of a semiconductor manufacturer, that is, a user of the semiconductor device installs a customer key for use in an encrypted communication and the like.

Figure 4:
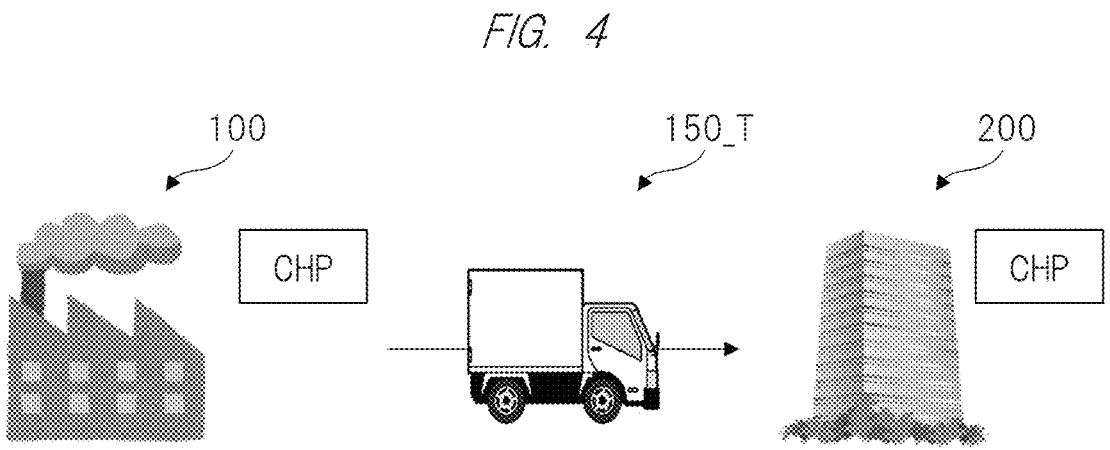
FIG. 4 is a diagram for explaining an outline of the embodiment.
Figure 5:
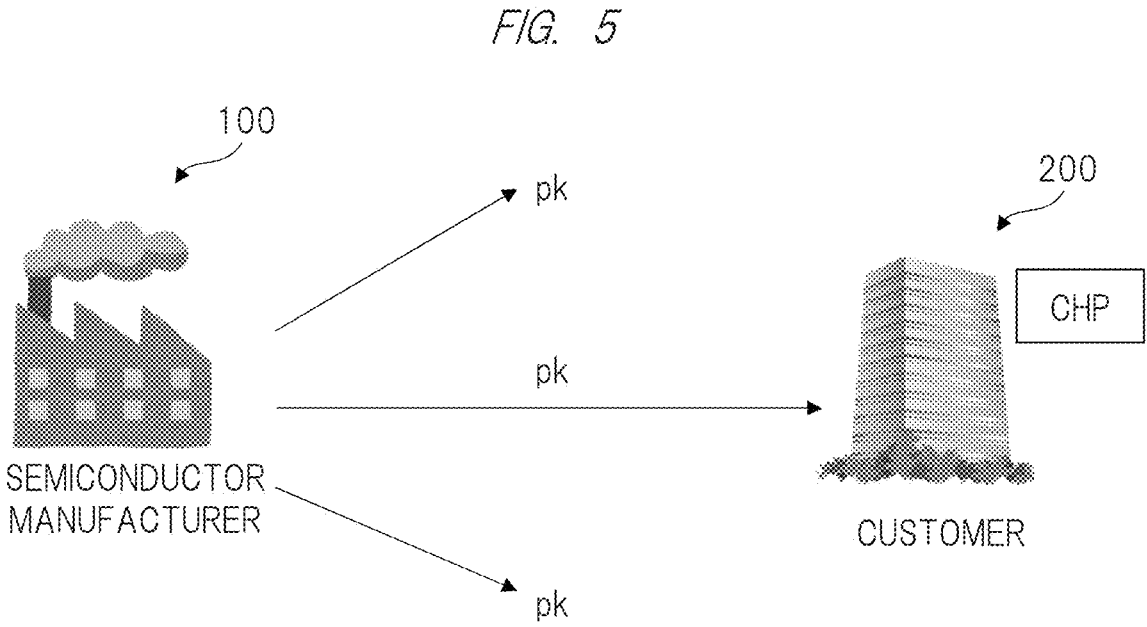
FIG. 5 is a diagram for explaining the outline of the embodiment.
Figure 6:
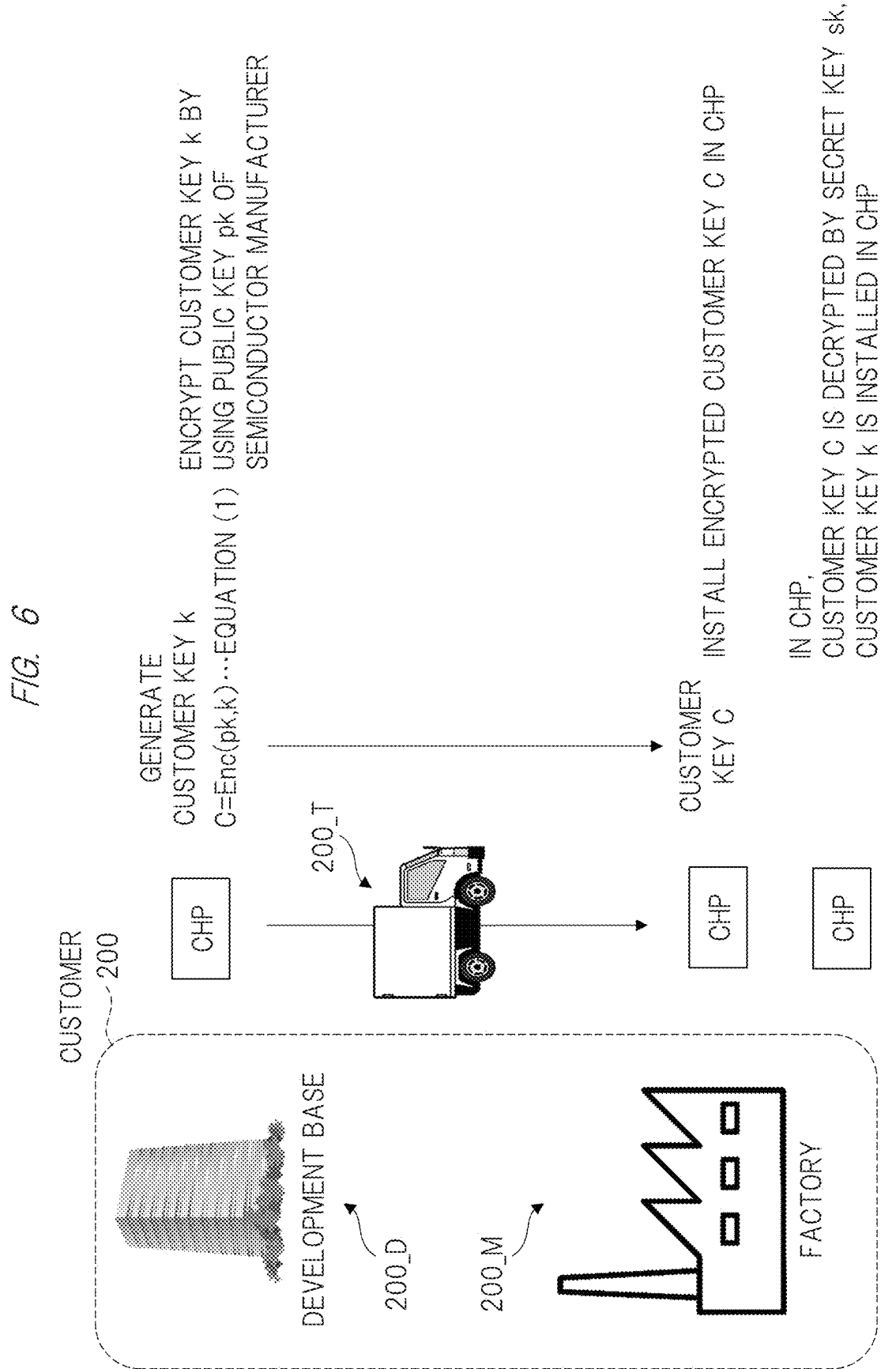
FIG. 6 is a diagram for explaining the outline of the embodiment.

FIGS. 4 to 6 are diagrams for explaining the outline of the embodiment.

In FIG. 4, reference numeral 100 denotes a semiconductor manufacturer that provides a semiconductor device CHP, and reference numeral 200 denotes a customer that develops and manufactures a product (customer product) using the provided semiconductor device CHP.

For a configuration of the semiconductor device CHP provided by the semiconductor manufacturer 100, an example thereof will be described later with reference to FIG. 2, and therefore, a detailed description thereof is omitted herein. However, the semiconductor device CHP includes a decryption functional unit. In the decryption functional unit, a decryption key for decryption is installed in advance. The decryption functional unit is a unit that, when the customer key encrypted by an encryption key corresponding to the decryption key is installed in the semiconductor device CHP, decrypts the encrypted customer key by the decryption key installed in advance, and installs the customer key in the semiconductor device CHP.

The semiconductor manufacturer 100 generates a public cryptographic key. That is, the semiconductor manufacturer 100 generates a secret key and a public key corresponding to the secret key. In the following description, the secret key generated by the semiconductor manufacturer 100 is denoted by reference symbol sk, and the public key corresponding thereto is denoted by reference symbol pk.

The semiconductor manufacturer 100 installs the secret key sk as the above-described decryption key in advance in the semiconductor device CHP, and provides the customer 200 therewith. FIG. 4 shows, as a specific example of the provision, a transporter 150_T that transports the semiconductor device CHP. In the example shown in FIG. 4, a plurality of the semiconductor devices CHP in each of which the secret key sk is installed in advance are transported from the semiconductor manufacturer 100 to the customer 200 by the transporter 150_T.

As shown in FIG. 5, the public key pk generated by the semiconductor manufacturer 100 is published by the semiconductor manufacturer 100. For example, the public key pk is stored in a semiconductor manufacturer server provided in the semiconductor manufacturer 100, and is published via a network. The customer 200 provided with the semiconductor devices CHP acquires the published public key pk as shown in FIG. 5. Although only one customer 200 is illustrated in FIG. 5, it is possible for a plurality of customers different from one another to acquire the public key pk since the public key pk is published.

Next, referring to FIG. 6, a description will be given of steps of customer key installation carried out in the customer 200.

Herein, the description will be given on the assumption that the customer 200 includes a customer development base (development base) 200_D that develops the customer product using each of the semiconductor devices CHP, and a customer factory (factory) 200_M that manufacturers the developed customer product. Moreover, it is assumed that the factory 200_M is located abroad, not domestically. That is, the development base 200_D and the factory 200_M are locally distant from each other.

FIG. 6 illustrates an example in which the semiconductor device CHP is transported from the semiconductor manufacturer 100 to the development base 200_D, and the semiconductor device CHP is transported from the development base 200_D to the factory 200_M by a transporter 200_T, but the present invention is not limited to this. For example, the semiconductor device CHP may be directly transported from the semiconductor manufacturer 100 to the factory 200_M.

In the development base 200_D, the customer 200 generates, as a customer key k, a cryptographic key for use in an encrypted communication and the like. Moreover, in the development base 200_D, the customer 200 encrypts the customer key k by the public key pk published by the semiconductor manufacturer 100. FIG. 6 shows this encryption by Equation (1). In Equation (1), Enc(pk, k) represents that the customer key k is encrypted by the public key pk, and represents that an encrypted customer key C is acquired by execution of Equation (1).

The encrypted customer key C is supplied from the development base 200_D to the factory 200_M, for example, via the network.

In the factory 200_M, the customer 200 installs the customer key C, which is supplied via the network, in the transported semiconductor device CHP. In the semiconductor device CHP, by the installation of the customer key C therein, the decryption functional unit provided in the semiconductor device CHP decrypts the customer key C by the secret key sk installed in advance. By this decryption, the customer key k that is not encrypted in the semiconductor device CHP is acquired, and is installed in the semiconductor device CHP.

The customer key k for use as the cryptographic key in the encrypted communication and the like is encrypted by the development base 200_D and supplied to the factory 200_M, and accordingly, it is possible to prevent the customer key k from being leaked in the factory 200_M. Moreover, in the development base 200_D, the customer 200 just needs to encrypt the customer key k by the public key pk published by the semiconductor manufacturer 100, and accordingly, complicated processing can be reduced. Further, since the customer key k is not handled in the semiconductor manufacturer 100, it is not necessary to manage the customer key k in the semiconductor manufacturer 100. Hence, cost for managing the customer key does not occur. Moreover, since the customer 200 does not process the customer key k in the semiconductor manufacturer 100, the customer 200 does not need to pay attention to a management status and the like of the customer key k in the semiconductor manufacturer 100.

Next, an embodiment will be described.

Embodiment

FIG. 1 is a diagram showing a customer key installation method according to the embodiment. In FIG. 1, reference numeral 100 denotes the semiconductor manufacturer that provides the semiconductor device CHP, and reference numeral 200 denotes the customer that develops and manufactures the customer product using the semiconductor device CHP. The customer 200 includes the development base 200_D that develops the customer product and the factory 200_M located abroad. As understood from FIGS. 4 and 6, for example, the semiconductor device CHP is transported from the semiconductor manufacturer 100 to the development base 200_D, and further, is transported from the development base 200_D to the factory 200_M. In FIG. 1, such two transportations are collectively shown by arrow 150.

Steps 1 and 2 of Semiconductor Manufacturer 100

First, steps carried out in the semiconductor manufacturer 100 will be described.

The semiconductor manufacturer 100 generates a public cryptographic key. That is, a public key pk and a secret key sk that decrypts the one encrypted by the private key pk are generated as a pair. Specifically, for example, a public cryptographic key generation device 101 configured in such a manner that a semiconductor manufacturer server provided in the semiconductor manufacturer 100 executes a program corresponding thereto generates the pair of the public key pk and the secret key sk. The public key pk generated by the public cryptographic key generation device 101 is stored in the semiconductor manufacturer server of the semiconductor manufacturer 100, and is published. In contrast, the generated secret key sk is supplied to a secret key installation device 102. The secret key installation device 102 writes the secret key sk into the semiconductor device CHP, thereby installing the secret key sk in the semiconductor device CHP.

Configuration of Semiconductor Device CHP

Next, an example of the semiconductor device CHP will be described with reference to FIG. 2.

FIG. 2 is a block diagram showing a configuration of the semiconductor device according to the embodiment. Although the semiconductor device CHP includes a plurality of functional units, FIG. 2 only shows portions necessary to describe the embodiment.

In FIG. 2, reference symbol MC denotes a processor (hereinafter, also referred to as a processing unit) that executes processing according to a program, and reference symbol RM denotes a nonvolatile memory in which the program to be executed by the processor MC is stored. Moreover, in FIG. 2, reference symbol FM1 denotes an electrically rewritable memory (hereinafter, also referred to as a flash memory or a first storage unit) into which the secret key sk is to be written, and reference symbol FM2 denotes an electrically rewritable memory (hereinafter, also referred to as a flash memory or a second storage unit) into which the encrypted customer key C is to be written. The secret key sk and the customer key C are written into the flash memories FM1 and FM2, so that the secret key sk and the customer key C are installed in the semiconductor device CHP.

In the semiconductor device CHP, the semiconductor manufacturer 100 writes the secret key sk by the secret key installation device 102 into the flash memory FM1 via an electrode BP provided in the semiconductor device CHP, so that the secret key sk is installed. In contrast, the customer key C is written into the flash memory FM2 from the outside of the semiconductor device CHP, thereby being installed. Both of the secret key sk and the customer key C may be configured to be written into a flash memory common thereto; however, in order to prevent leakage, tampering and the like of the secret key sk, it is desired that the separate flash memories FM1 and FM2 be prepared as shown in FIG. 2 and the secret key sk and the customer key C be written thereinto.

When the customer key C is installed, the processor MC reads out the secret key sk installed in advance and the installed customer key C from the flash memories FM1 and FM2 according to the program, and decrypts the customer key C by the secret key sk. Moreover, the processor MC writes (installs) the customer key k, which is generated by the decryption, for example, into the flash memory FM2 according to the program.

The processor MC is also connected to a communication unit TT. When an encrypted communication is performed by using the communication unit TT, the processor MC performs the encryption and/or the decryption by using the customer key k installed in the flash memory FM2.

In FIG. 2, the decryption functional unit is composed of the program stored in the processor MC, the flash memories FM1 and FM2 and the nonvolatile memory RM; but is not limited to this. Moreover, the communication unit for use when the encrypted communication is performed may be provided outside of the semiconductor device CHP.

Steps 1 to 3 of Customer

Returning to FIG. 1, the description will be continued.

In the development base 200_D, the customer 200 develops the customer product using the semiconductor device CHP. For example, at this time, in the development base 200_D, the customer 200 generates the customer key k installed in the semiconductor device CHP. In the development of the customer product, the customer 200 sets such a specification of a product, in which a communication between the customer product and for example, the customer server 201 provided in the development base 200_D is encrypted, by using, as a cryptographic key, the customer key k installed in the semiconductor device CHP.

For example, in the development base 200_D, the customer 200 generates the customer key k installed in the semiconductor device CHP. Specifically, a customer key generation device 201_G provided in the development base 200_D generates the customer key k. Next, in the development base 200_D, the customer 200 encrypts the customer key k by using the public key pk published by the semiconductor manufacturer 100. Specifically, an encryption device 201_C provided in the development base 200_D generates the encrypted customer key C by executing Equation (1) by using the customer key k and the public key pk.

Although not particularly limited, the customer key generation device 201_G and the encryption device 201_C are achieved by the encryption device 201_C in such a manner that the customer server 201 executes a program corresponding thereto.

The encrypted customer key C is supplied via the network to the factory 200_M, for example, by the customer server 201.

In the factory 200_M, the customer 200 installs the customer key C, which is supplied from the development base 200_D, in the transported semiconductor device CHP. Specifically, a key installation device 202 provided in the factory writes the customer key C, which is supplied via the network, into the semiconductor device CHP.

The customer key C is written, so that, in the semiconductor device CHP, the decryption functional unit decrypts the customer key C by the secret key sk installed in advance, and the customer key k acquired by the decryption is installed in the semiconductor device CHP.

Figure 3:
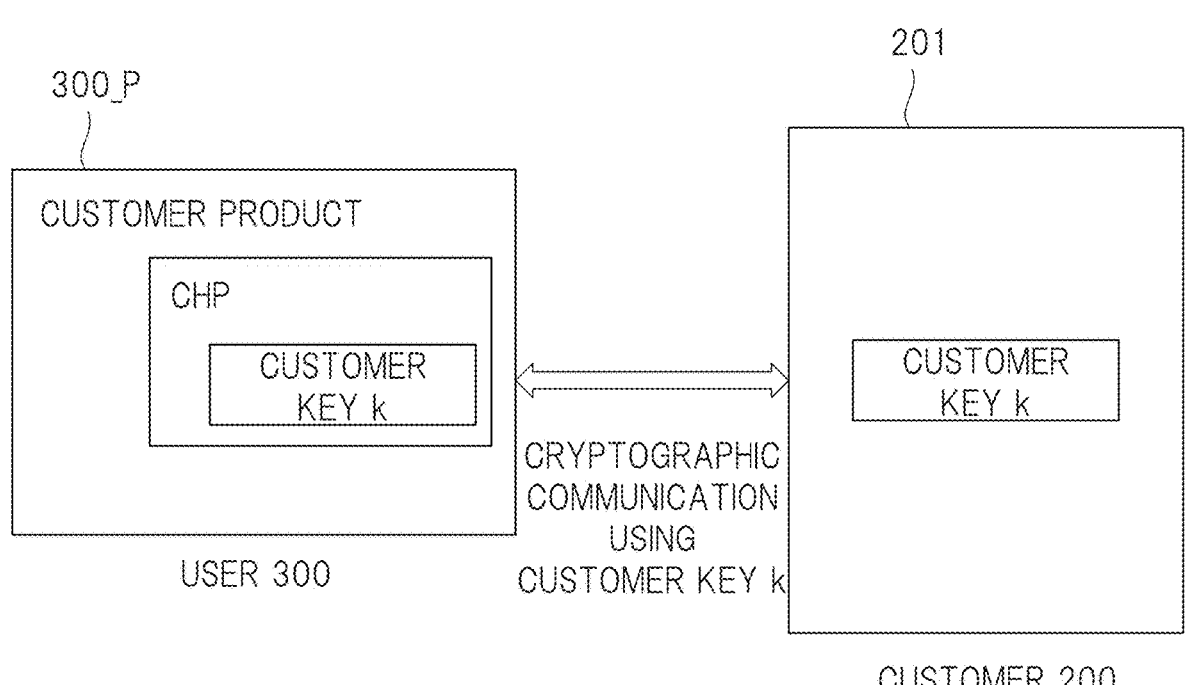
FIG. 3 is a diagram for explaining a system using a customer key installed by the customer key installation method according to the embodiment.

FIG. 3 is a diagram for explaining the system using the customer key installed by the customer key installation method according to the embodiment.

In FIG. 3, reference numeral 201 denotes a customer server provided in the development base 200_D. Moreover, reference numeral 300_P denotes a customer product purchased from the customer 200 by a product user 300. In the customer product 300_P, incorporated is the semiconductor device CHP in which the customer key k is installed by the customer key installation method according to the embodiment.

For example, for a service such as an upgrade of the customer product 300_P, the customer product 300_P and the customer server 201 are connected to each other via the network. At this time, the communication on the network is encrypted by using the customer key k. For example, the semiconductor device CHP decrypts the data, which is supplied via the network, by using the customer key k installed therein, and performs processing by using the decrypted data. Moreover, in the case of sending the data from the customer product 300_P to the customer server 201, then by using the customer key k, the semiconductor device CHP encrypts the data to be sent, followed by sending.

In the customer server 201 also, the encryption and the decryption are performed by using the customer key k similarly. As a result, it becomes possible to provide the service only to the customer product in which the semiconductor device having the customer key k installed therein is incorporated.

In accordance with the embodiment, at the time of installing the customer key in the semiconductor device, it is possible to safely install the customer key in the semiconductor device while reducing the complicated processing. Moreover, in the semiconductor manufacturer that provides the semiconductor device, it is possible to suppress the increase of the cost required for the management of the customer key.

While the invention made by the inventor thereof has been specifically described on the basis of the embodiments thereof, needless to say, the present invention is not limited to the above-described embodiments, and is modifiable in various ways within the scope without departing from the spirit thereof. Moreover, the cryptographic key that is the customer key k may be a parameter (coefficient and the like) at the time of using the cryptogram, or may be both of the cryptographic key and the parameter.

What is claimed is:

1. A cryptographic key installation method of installing a cryptographic key in a semiconductor device, the cryptographic key installation method comprising:

installing a secret key in a first nonvolatile memory of the semiconductor device by a provider side only during manufacturing of the semiconductor device;

in response to completing the manufacturing of the semiconductor device, installing an encrypted cryptographic key is stored in a second nonvolatile memory of the semiconductor device by a user side during use of the semiconductor device, the second nonvolatile memory being separate from the first nonvolatile memory, wherein the semiconductor device includes a decryption functional unit configured to decrypt the encrypted cryptographic key using the secret key to generate the cryptographic key, wherein the encrypted cryptographic key is generated by encrypting the cryptographic key with a public key corresponding to the secret key and wherein the user side installs the encrypted cryptographic key in the second nonvolatile memory of the semiconductor device.

2. The cryptographic key installation method according to claim 1, wherein the provider side generates the secret key and the public key, installs the secret key in the decryption functional unit of the semiconductor device during the manufacturing of the semiconductor device, and provides the public key to the user side.

3. The cryptographic key installation method according to claim 2, wherein the user side includes an encryption device and a key installation device respectively located at different locations, wherein the encryption device generates the encrypted cryptographic key, and wherein the key installation device installs the encrypted cryptographic key in the semiconductor device.

4. The cryptographic key installation method according to claim 3, wherein the encrypted cryptographic key is supplied via a network from a development base including the encryption device to the key installation device.

* * * * *